United States Patent
Cohen et al.

(10) Patent No.: US 7,837,318 B2
(45) Date of Patent: Nov. 23, 2010

(54) PHOTO-CURABLE INK-JET INK COMPOSITIONS, SYSTEMS, AND METHODS

(75) Inventors: Eytan Cohen, Raanana (IL); Amir Shapira, Herzlia (IL); Efrat Soroker, Zur Moshe (IL); Or Brandstein, Haifa (IL); Richard Power, Clifton (ZA); Guy Peled, Netanya (IL); Ifat Zarski, Netanya (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 307 days.

(21) Appl. No.: 11/864,352

(22) Filed: Sep. 28, 2007

(65) Prior Publication Data
US 2008/0225099 A1    Sep. 18, 2008

Related U.S. Application Data

(63) Continuation-in-part of application No. 11/724,954, filed on Mar. 16, 2007.

(51) Int. Cl.
    *G01D 11/00*    (2006.01)
(52) U.S. Cl. ............................ 347/100; 347/95; 523/160
(58) Field of Classification Search .................. 347/100, 347/95, 96, 101, 102; 106/31.6, 31.13, 31.27; 523/160
See application file for complete search history.

(56) References Cited

U.S. PATENT DOCUMENTS

| | | | |
|---|---|---|---|
| 6,428,862 | B1 | 8/2002 | Noguchi |
| 7,056,559 | B2 | 6/2006 | Nakajima |
| 7,125,112 | B2 | 10/2006 | Ushirogouchi |
| 7,141,104 | B2 | 11/2006 | DeVoeght |
| 2004/0036753 | A1* | 2/2004 | Hirai ........................... 347/102 |
| 2006/0158492 | A1 | 7/2006 | Odell et al. |
| 2006/0254459 | A1* | 11/2006 | Mori et al. ................ 106/31.43 |
| 2006/0258776 | A1* | 11/2006 | Aoai ........................... 347/100 |
| 2008/0225063 | A1* | 9/2008 | Cohen et al. ................ 106/31.6 |

FOREIGN PATENT DOCUMENTS

| | | |
|---|---|---|
| EP | 1 721 943 A | 11/2006 |
| WO | 00/20517 A | 4/2000 |
| WO | 03/010249 A | 2/2003 |

OTHER PUBLICATIONS

Cohen et al., USPTO U.S. Appl. No. 11/724,954, filed Mar. 16, 2007 entitled "Photo-Curable Ink-Jet Ink Compositions, Systems, and Methods".

* cited by examiner

*Primary Examiner*—Manish S Shah

(57) ABSTRACT

The present invention is drawn to photo-curable ink-jet ink compositions, systems, and methods. One exemplary ink-jet ink composition includes a liquid vehicle, a milled pigment which has been milled in a milling solvent having minimal to no gas solvency for the milled pigment, and a photo initiator. In this embodiment, the composition can be ink-jettable at frequencies of at least 29 KHz without requiring degassing during printing.

11 Claims, No Drawings

PHOTO-CURABLE INK-JET INK COMPOSITIONS, SYSTEMS, AND METHODS

CROSS-REFERENCE TO RELATED APPLICATIONS

This application is a continuation-in-part of co-pending application Ser. No. 11/724,954 filed Mar. 16, 2007 incorporated herein by reference.

BACKGROUND OF THE INVENTION

Inks used in the ink-jet printing industry are typically liquid dispersions, solutions, or emulsions. Known types of ink include oil-based inks, non-aqueous solvent based inks, water-based inks, and solid inks. The ink-jet printing process involves jetting droplets of ink from orifices of a print head onto a print medium. Then, the deposited ink droplets are either affirmatively dried, e.g., using heat or forced air, or allowed to dry at ambient conditions.

Recently, curing of ink by radiation, and in particular ultraviolet (UV) curing has become somewhat popular. In these cases, special radiation-curable ink is used and the image is cured by exposure to a radiation source. The term "curing" in the context of the present application refers to a process of converting a liquid, such as ink, into a solid by exposure to actinic radiation. The use of radiation-curable inks and the curing process are rapidly becoming an alternative to the established conventional drying process.

Among the problems associated with the use of UV curable inks is poor adhesion to non-porous or low surface tension substrates such as polypropylene, vinyl, polyolefins, and the like. Additionally, depending on the ink load, when printing UV curable inks on top of one another, proper cohesion between ink layers on substrate can be less than desirable. Further, often UV curable inks are prepared using oligomers such that the inks have a viscosity that is much higher than more typical solvent or water based inks. Jetting of such viscous inks presents certain difficulties, and further, can only be jetted at low frequencies, causing slower printing speeds. Because these inks are more viscous, they are also usually jetted at elevated temperatures, e.g., above about 40° C. This elevated temperature allows some control over the inks otherwise high viscosity, but adversely affects the life of printing architecture including the print head.

Another problem associated with the use certain UV curable inks is their relatively high gas (air) content that forces use of so called "lungs" or gas extraction devices in the printer ink system or in the print head itself especially while printing at very high frequencies. This causes increase in the cost of the printers and frequent print head purging and maintenance cycles. Another downside of UV curable inks is that these inks are usually accompanied by emission of unpleasant odors. These odors can disturb the user and often require special air trapping and evacuation systems. Thus, there is significant room for improvement in the area of UV curable inks.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a pigment" includes reference to one or more of such materials.

The term "curing" throughout the specification and the claims refers to the process of converting a liquid, such as, for example ink to a solid by exposing it to an actinic radiation, such as photo radiation, e.g., ultraviolet radiation.

In accordance with these definitions, a photo-curable ink composition for ink-jet printing can comprise a liquid vehicle, a milled pigment having been milled in a milling solvent, e.g., triethyleneglycol divinyl ether (DVE-3), having minimal to no gas solvency for the milled pigment, and a photo initiator. These compositions can be ink-jettable at frequencies of at least 29 KHz without requiring degassing during printing.

In another embodiment, an ink-jet ink printing system can comprise a non-porous or low surface tension substrate, a photo-curable ink-jet ink, and a photo energy source configured to apply photo energy to the ink-jet ink once printed on the non-porous substrate. The photo energy can include UV, IR, and/or visible light. More specifically, the photo energy can have a frequency and energy level suitable for curing the photo-curable ink-jet ink. The ink-jet ink can comprise a liquid vehicle, a milled pigment having been milled in a milling solvent having minimal to no gas solvency for the milled pigment, and photo initiator.

In another embodiment, a method of printing an image can comprise jetting a photo-curable ink-jet ink onto a non-porous or low surface tension substrate at a firing frequency of greater than 29 KHz. The photo-curable ink-jet ink can comprise a liquid vehicle, a milled pigment having been milled in a milling solvent having minimal to no gas solvency for the milled pigment, and a photo initiator. Another step includes applying photo energy to the photo-curable ink-jet ink once printed on a substrate, wherein the photo energy has a frequency and energy level suitable for curing the photo-curable ink-jet ink. It is also notable that though the systems and methods are useful on more difficult printing substrates, e.g., non-porous substrates or low surface tension substrates, these inks are also acceptable for printing on porous substrates.

In accordance with the general teachings of the present invention, as these inks are typically photo-curable, according to some embodiments of the present invention, the curing radiation can be ultraviolet radiation and the ink used for printing can be ultraviolet (UV) curable ink containing UV activated initiators, also known as UV initiators. In these instances, curing radiation can be UV radiation radiated by UV lamps, blue lasers, UV lasers, or ultraviolet LEDs, for example. According to some embodiments of the present invention, the curing radiation may be provided by a source of ultraviolet radiation operating in a continuous mode. According to other embodiments of the present invention, the curing radiation may be provided by a source of ultraviolet radiation operating in a flash or pulsed mode. Other methods of applying UV radiation can also be implemented as would be known by those skilled in the art after considering the present disclosure. This being stated, other curing systems including those other than UV curing systems can also be used, as long as the radiation used is appropriate to initiate the curing process of the ink-jet ink, e.g., IR or visible light systems.

Some embodiments of the present invention are directed to or include various compositions of photo-curable ink-jet recording fluids. Thus, the ink composition can comprise a mixture of acrylates that are capable of undergoing polymerization reaction under UV curable radiation in the presence of UV-activated initiators. Non-limiting examples of UV-activated initiators can include alpha amino ketone UV photoinitiators such as Ciba Irgacure 907, Ciba Irgacure 369, and Ciba Irgacure 379; bis acylphosphine oxide (BAPO) UV photoinitiators such as Irgacure 819, Darocur 4265, and Darocur TPO; alpha hydroxy ketone UV photoinitiators such as Irgacure 184 and Darocur 1173; including photoinitiators with or without sensitizers such as Darocure ITX (2-isopropyl thioxanthone). Preferably the UV-activated initiator includes the alpha amino ketone UV photoinitiator Irgacure 379. Regarding the acrylates, these compositions can be useful as some of the acrylates are highly reactive, and low viscosity acrylates in particular have excellent flexibility. Further, some acrylates, such as monoacrylates, have good solvency, high flexibility, and low Glass Transition Temperature (Tg). Low Tg can improve the flexibility of the ink layer at room temperature. Monoacrylates have good adhesion to plastic, provide higher flexibility, and thus, enhance the adhesion to plastic even when the plastic is flexed. Some monoacrylates can modify or swell certain plastic substrates and other non-porous, porous, and/or low surface tension substrates such as polyvinyl chlorides (PVC), polymethyl methacrylates (PMMA), and polyolefins. This modification or swelling of the substrate can also improve adhesion. Other acrylates, such as triacrylates, can contribute to the ink low shrinkage, good reactivity, improved mechanical properties, and chemical resistance, e.g., the higher the molecular weight, the lower the crosslink density and the lower the shrinkage. Still further, some of the acrylates, such as diacrylates, possess high solvency and high reactivity facilitating good adhesion to non-porous surfaces. This being stated, any suitable acrylates, or a combination of acrylates for achieving a balance of these or other properties, can be used. Further, although the scope of present invention is not limited in this respect, the acrylates for use can also be modified or derivatized acrylates. Examples include polyetherpolyol acrylate, polyether acrylate oligomer, cyclic thimethylopropane formal acrylate (CTFA), or amine acrylate. Amine acrylates in particular, such as Craynor 386 and Genomer 5275, can be useful for improving cohesion between layers of printed ink-jet inks, as well as adhesion to non-porous substrates upon printing.

The relative amounts of the different components of the ink-jet recording composition may vary. For example, the relative amount of the photo initiator may range from about 0.1 wt % to about 5 wt %, and in another embodiment, from 0.1 wt % to 4 wt %. In other embodiments, the relative amount of the photo initiator can be from 0.2 wt % to 2 wt %, or even from 0.2 wt % to 1 wt %. Likewise, the relative amount of various other components that can be present can range from 1 wt % to 30 wt %. For example, an acrylate can be present at from 1 wt % to 8 wt %. Alternatively or additionally, the relative amount of 1 wt % to 25 wt %, preferably 2 to 20 wt %, preferably 3 to 15 wt % of vinyl caprolactam can be used to improve the adhesion of the ink layers to the substrate as well. Preferably, where present, the vinyl caprolactam is included in an amount of less than about 10 wt %, preferably less than about 7 wt %, preferably less than 5 wt %, preferably less than 3 wt %. In this regard, the present applicant has found that, surprisingly, where the vinyl caprolactam is present in this low amount, it is possible to obtain an ink composition which retains desirable properties while minimizing odor generated on printing.

The composition may further include any coloring agent, such as for example pigments such as milled pigments, and optionally additives such as dispersants, wetting agents, surfactants, leveling agents, and the like. Non-limiting examples of pigments that can be used in the formulations of exemplary embodiments of the present invention include E4GN Yellow 150, RT-355-Magenta, Hostaperm Blue P-BFS Cyan, Sunfast Black 7, other pigments, or mixture of several pigments. More generally, the black and colored pigments for use in the invention are not particularly limited, and inorganic pigments or organic pigments may be used. Suitable inorganic pigments include, for example, titanium oxide, cobalt blue ($CoO-Al_2O_3$), chrome yellow ($PbCrO_4$), and iron oxide. Suitable organic pigments includes, for example, azo pigments, polycyclic pigments (e.g., phthalocyanine pigments, perylene pigments, perynone pigments, anthraquinone pigments, quinacridone pigments, dioxazine pigments, thioindigo pigments, isoindolinone pigments and quinophthalone pigments), dye chelates (e.g., basic dye type chelates and acidic dye type chelate), nitropigments, nitroso pigments, and the like. In conjunction with these or other pigments, non-limiting examples of dispersants that can be used in the formulations of exemplary embodiments of the present invention include Solsperse 32000, Solsperse 39000, Solsperse 5000, Solsperse 22000, Disperbryk 163, Disperbyk 167, Disperbyk 168, Disperbyk 180, Disperbyk 190, Disperbyk 191, or the like.

As mentioned, the ink-jet ink compositions can optionally also include wetting agents. Non-limiting examples of such wetting agents can include siliconepolyether acrylate such as Tego Rad 2200 N, Tego Rad 2300, and Byk 358N. The inks can also include polyether modified poly-dimethyl-siloxane wetting agents such as Byk 333, Byk 307, and Silwet L-7604. If used, wetting agents can be present at from 0.01% to about 10% by weight of the ink-jet ink composition.

A unique feature of the photo-curable inks of the present invention is that they can be prepared such that they do not require removal of air or other gases from the ink prior to and/or during use, even at high jetting frequencies, e.g., greater than 18-20 KHz, greater than 25 KHz, or greater than even 29 KHz. As a note, the fact that these inks can be fired at high frequencies does not limit these inks to high firing frequency systems. These inks can also be fired at relatively low firing frequencies as well. This being stated, generally, with UV and other photo-curable inks, such inks are typically characterized by high gas content which interferes with the ink-jet process. The inks of the present invention can be characterized as having unusually low gas content. In some embodiments, the process used in milling of pigments can contribute to this advantage. For example, by milling pigments with specific solvents, air or gas generation or release can be minimized or eliminated. Examples of suitable solvents for use in achieving this goal include solvents selected from the glycol di- or tri-acrylate family and solvents selected from the vinyl ether family. An example of an appropriate solvent selected from the glycol diacrylate and triacrylate family is tripropylene glycol diacrylate. An example of a preferred solvent is triethyleneglycol divinyl ether (DVE-3), which is one example of a milling solvent that enables the print heads to be operated at high ejection frequency without prior ink degassing. It is notable that DVE-3 is merely one example of such a solvent, and depending on the pigment, other solvents can also provide a similar function. Thus, there are other solvent choices for milling that can be used in accordance with embodiments of the present invention, examples of which are indicated above. In one aspect of the invention, pigments and milling solvents can be selected that are relatively non-reactive to one another, or solvent(s) can be selected that has minimal to no gas solvency for the pigment particles. It is also notable that UV inks of the prior art often have dissolved oxygen values of between 6 to 8 ppm by weight in the ink, whereas the inks of the present invention, which use a milling solvent having low gas solvency for the pigment, e.g., DVE-3, can have dissolved oxygen values less than 5 ppm by weight, e.g., from 3 to 5 ppm by weight, which can reduce the reactivity of the ink.

As many photo-curable inks are also characterized by having certain unpleasant odors, by using fragrances, e.g., aromatic fluids such as HYPER BLUE (702781) of Symrise Company (Germany) or other similar fragranced fluids, the ink composition of the present invention may be further characterized as having a masked or reduced unpleasant odor compared to similarly prepared inks without the addition of the fragranced fluids. This fragrance or mixture of several fragrance oils has a capability to mask the original odor of the ink, and to bring a new and more desirable odor, such as lavender, lemon, apple, strawberry, mint, etc., to the ink, thereby providing improvement in the ink to the user over other photo-curable inks known in the industry.

It has also been found that, advantageously, unpleasant odors associated with the photo-curable inks of the present invention can be minimized by careful selection of the photoinitiator used. In this regard, it has surprisingly been found that particularly low levels of unpleasant odor are observed where the photoinitator used comprises Irgacure 379 (IRG379).

Furthermore, the present applicant has identified that high levels of unpleasant odor may be observed where the photo-curable ink composition comprises vinyl caprolactam. As described previously, it is advantageous that vinyl caprolactam is included in ink compositions in order to improve adhesion of ink layers to the substrate to which they are applied. The present applicant has surprisingly found that in the photo-curable ink compositions of the present invention, the levels of vinyl caprolactam can be significantly reduced, and hence the levels of unpleasant odors significantly reduced, without adversely affecting the adhesion properties of the ink formulation.

Particularly low levels of unpleasant odors have been observed where the photoinitator is Irgacure 379 and low levels of vinyl caprolactam are included in the photo-curable ink formulation.

Typically, in order to produce full color images, an ink set can include cyan, magenta, and yellow ink-jet ink compositions, or alternatively, cyan, light cyan, magenta, light magenta, and yellow ink-jet ink compositions. Black inks can also be included in these ink sets. Other combinations are also possible.

EXAMPLES

In the following examples of ink compositions, ingredients' designations are in weight percentages or volume percentage as indicated. It is noted that the following examples do not limit in any way the scope of the present invention. The dilution formulation used herein is an exemplary ink dilution formulation, which with some variation, is common to all inks and is used to prepare each ink composition by mixing millbase formulations with the dilution formulations. The dilution formulation serves as a vehicle for the ink-jet inks described below. The dilution formulations may contain one or more components that contribute to acceptable UV curing and film properties. This being stated, the following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention.

Example 1

Dilution Formulations

| Dilution Formulation A | |
|---|---|
| Ingredient (Trade Name and Chemical Description) | Wt % |
| Genomer 3364<br>Modified Polyetherpolyol Acrylate | 2%-14% |
| Craynor 435<br>Polyether Acrylate Oligomer | 5%-18% |
| Sartomer 531<br>Cyclic Thimethylopropane Formal Acrylate (CTFA) | 10%-18% |
| Crynor 386<br>Amine Acrylate | 1%-8% |
| SR 256<br>97% 2-(2-Ethoxyethoxy)ethyl Acrylate<br>3% 2,2'-Oxydiethyl Diacrylate | 10%-18% |
| V-Caprolactam<br>n-Vinyl Caprolactam | 5%-30% |
| SR 508<br>Dipropylene Glycol Diacrylate | 4%-20% |
| IRG 907<br>2-Methyl-1-(4-methylthiophenyl)-2-morpholinopropan-1-one | 1%-5% |
| Darocur ITX<br>2-Isopropyl Thioxanthone | 0.5%-2% |
| IRG 819<br>Phenyl Bis(2,4,6-trimethylbenzoyl)-phosphine oxide | 1%-4% |
| TEGO Rad 2000N<br>Siliconepolyethere Acrylate | 0.05%-1% |

According to exemplary embodiments of the present invention, the ink formulations may comprise one or more of the following exemplary UV activated initiators (photoinitiators): IRG 907, Darocur ITX, or IRG 819, and sensitizers such as Darocur ITX. The activators may be selected so as to enhance ink surface curing as well as ink deep curing and other desired ink curing process parameters.

According to exemplary embodiments of the present invention, the ink formulations may comprise low viscosity ingredients for controlling the ink viscosity. Non-limiting examples of such ingredients can include modified polyetherpolyol acrylate, triethyleneglycol divinyl ether, or the like.

According to exemplary embodiments of the present invention, amine acrylate can improve the cohesion between the ink layers and adhesion to the substrate, and vinyl caprolactam can improve the adhesion of the ink layers to the substrate as well. Such ingredients as monoacrylates have low Glass Transition Temperature (Tg) and support high flexibility of the ink layer.

The dilution formulations set forth above are produced by mixing Genomer 3364, Craynor 435, Sartomer 531, Craynor 386, SR 256, SR 508 (422), and V-Caprolactam, followed by stirring at elevated temperatures of about 40-50° C. until all of the V-Caprolactam dissolves. To the solution is added the UV curing initiators: IRG 907, Darocure ITX, and IRG 819, and stirring the mixture under elevated temperature of 40-50° C. until they dissolve as well.

In an alternative embodiment, another dilution formulation can be prepared similar to that described above, without n-vinyl caprolactam, as set forth below.

| Dilution Formulation B | |
|---|---|
| Ingredient (Trade Name and Chemical Description) | Wt % |
| Genomer 3364<br>Modified Polyetherpolyol Acrylate | 2%-14% |
| Craynor 435<br>Polyether Acrylate Oligomer | 5%-18% |
| Sartomer 531<br>Cyclic Thimethylopropane Formal Acrylate (CTFA) | 10%-18% |
| Crynor 386<br>Amine Acrylate | 1%-8% |
| SR 256<br>97% 2-(2-Ethoxyethoxy)ethyl Acrylate<br>3% 2,2'-Oxydiethyl Diacrylate | 10%-40% |
| SR 508<br>Dipropylene Glycol Diacrylate | 4%-20% |
| IRG 907<br>2-Methyl-1-(4-methylthiophenyl)-2-morpholinopropan-1-one | 1%-5% |
| Darocur ITX<br>2-Isopropyl Thioxanthone | 0.5%-2% |
| IRG 819<br>Phenyl Bis(2,4,6-trimethylbenzoyl)-phosphine Oxide | 1%-4% |
| TEGO Rad 2000N<br>Siliconepolyethere Acrylate | 0.05%-1% |

Examples 2-11 set forth millbase ink formulations and ink-jet ink formulations which are formed by combining one of the specific millbase formulations set forth below with Dilution Formulation A above. It is to be noted that though none of the ink-jet inks in Examples 2-11 utilize Millbase Formulation B, this is a matter of simple substitution that can occur in all examples.

Example 2

Yellow Millbase Ink Formulations

| Ingredient (Trade Name and Description) | Wt % |
|---|---|
| E4GN Yellow 150<br>Pigment (Bayer) | 10%-30% |
| DVE-3<br>Triethyleneglycol Divinyl Ether | 50%-80% |
| Solsperse 32000<br>Dispersant Agent | 5%-20% |

A yellow millbase formulation was prepared by mixing DVE-3 with Solsperse 32000 and E4GN Yellow 150 pigment. The mixture is stirred for about one hour and the pigments were ground in the mixture for about 4 hours using a bead mill with throughput of 20 liter/hour.

Example 3

Yellow Ink-Jet Ink Formulations

A yellow ink-jet ink composition was prepared by mixing 93 parts by weight of a dilution formulation prepared in accordance with Example 1 with the 7 parts by weight of a yellow millbase formulation prepared in accordance with Example 2. To the mixture was added a wetting agent (TEGO Rad 2000N) and the mixture was stirred for an additional 10 minutes.

The yellow ink-jet ink prepared herein was jetted through a micromachined HP-Scitex ink-jet print head onto a polypropylene substrate and cured by a continuous UV radiation at 20 millijoule/cm$^2$ to 50 millijoule/cm$^2$. The UV radiation caused the ink to become cured on the polypropylene substrate, and the cured ink was uniform and glossy that could withstand industry standard erasure scratch, folding, and cutting tests. Additionally, no air/gas from ink extraction systems were used in the print head operation. It was discovered that, as with this ink and subsequent exemplary inks described below, that the milling process performed in the presence of a milling solvent having minimal to no gas solvency for the pigment particles (triethyleneglycol divinyl ether for this particular example) made it possible to prepare an ink-jet ink that did not require subsequent air/gas extraction. Thus, as a result of this, print heads could be operated at a high ejection frequency (at least 29 KHz) without using any air extracting/removal device such as "lungs." Further, the unpleasant odor that was noticed upon printing or curing was masked.

Example 4

Magenta Millbase Ink Formulations

| Ingredient (Trade Name and Description) | Wt % |
|---|---|
| RT-355-Magenta<br>Pigment (Ciba) | 10%-30% |
| DVE-3<br>Triethyleneglycol Divinyl Ether | 50%-80% |
| Solsperse 39000<br>Dispersant Agent | 1%-8% |
| Dysperbryk-163<br>24% Xylene, 12% n-Butyl Acetate<br>13% 1-Methoxy-2-propanol Acetate<br>6% Ethylbenzene | 10%-20% |

A magenta millbase formulation was prepared by mixing DVE-3 with Solsperse 39000, RT-355-Magenta pigment, and Disperbryk-163. The mixture is stirred for about one hour and the pigments were ground in the mixture for about 4 hours using a bead mill with throughput of 20 liter/hour.

Example 5

Magenta Ink-Jet Ink Formulations

A magenta ink-jet ink composition was prepared by mixing 82 parts by weight of a dilution formulation prepared in accordance with Example 1 with 18 parts by weight of a magenta millbase prepared in accordance with Example 4. A wetting agent (TEGO Rad 2000N) was then added, and the mixture was stirred for about 10 minutes.

The magenta ink-jet ink was jetted through a micromachined HP-Scitex ink jet print head onto a polyolefine substrate and cured by continuous UV radiation source at 40 millijoule/cm$^2$ to 70 millijoule/cm$^2$. After the ink was cured, the gloss and density of a printed image remained stable for a long period, and further, the ink was stable in ink form after storage for two weeks at a temperature of 40° C. No changes in the ink viscosity were observed. No use of a degassing "lung" was required. This ink could be jetted at ejection frequencies in excess of 29. Further, upon jetting or curing, the unpleasant odor often associated with UV curable inks was reduced.

Example 6

Light Magenta Ink-Jet Ink Formulations

A light Magenta ink-jet ink composition was prepared by mixing 96 parts by weight of a dilution formulation set forth in accordance with Example 1 with 4 parts by weight of a magenta millbase formulation prepared in accordance with Example 4. To the mixture was added a wetting agent (TEGO Rad 2000N), which was stirred for about 10 minutes. No use of a degassing "lung" was required during jetting, and the ink could be jetted at ejection frequencies in excess of 29 KHz. Further, upon jetting or curing, the unpleasant odor often associated with UV curable inks was reduced.

Example 7

Cyan Millbase Formulations

| Ingredient (Trade Name and Description) | Wt % |
| --- | --- |
| Hostaperm Blue PBFS CyanPigment (Clariant) | 10%-30% |
| DVE-3 Triethyleneglycol Divinyl Ether | 50%-80% |
| Solsperse 39000 Dispersant Agent | 5%-20% |

A cyan millbase formulation by was prepared by mixing DVE-3 with Solsperse 39000, and Hostaperm Blue P-BFS Cyan pigment. The mixture was stirred for about one hour and the pigments were ground for about 4 hours in a bead mill with throughput of 20 liter/hour.

Example 8

Cyan Ink-Jet Ink Formulations

A cyan ink-jet ink composition was prepared by mixing 90 parts by weight of a dilution formulation prepared in accordance with Example 1 with 10 parts by weight of a cyan millbase formulation prepared in accordance with Example 7. To the mixture was added a wetting agent (TEGO Rad 2000N), and the mixture was stirred for about 10 minutes. No use of a degassing "lung" was required during jetting, and the ink could be jetted at ejection frequencies in excess of 29 KHz. Further, upon jetting or curing, the unpleasant odor often associated with UV curable inks was reduced.

Example 9

Light Cyan Ink-Jet Ink Formulations

A light cyan ink-jet ink composition was prepared by mixing 97 parts by weight of a dilution formulation set forth in accordance with Example 1 with 3 parts by weight of a cyan millbase formulation prepared in accordance with Example 7. To the mixture was added a wetting agent (TEGO Rad 2000N), which was stirred for about 10 minutes. No use of a degassing "lung" was required during jetting, and the ink could be jetted at ejection frequencies in excess of 29 KHz. Further, upon jetting or curing, the unpleasant odor often associated with UV curable inks was reduced.

Example 10

Black Millbase Formulations

| Ingredient (Trade Name and Description) | Wt % |
| --- | --- |
| Sunfast Black 7 Pigment (Sunjet) | 20%-40% |
| DVE-3 Triethyleneglycol Divinyl Ether | 50%-80% |
| Solsperse 39000 Dispersant Agent | 5%-15% |

A black millbase formulation was prepared by mixing DVE-3 with Solsperse 39000 and Sunfast Black 7 pigment, stirring it for about one hour, and grinding the mixture for about 4 hours in a bead mill with throughput of 20 liter/hour.

Example 11

Black Ink-Jet Ink Formulations

A black ink-jet ink composition was prepared by mixing 93 parts by weight a dilution formulation set forth in accordance with Example 1 with 7 parts by weight of a black millbase formulation prepared in accordance with Example 10. A wetting agent (TEGO Rad 2000N) was also added to the mixture and was stirred for about 10 minutes. No use of a degassing "lung" was required during jetting, and the ink could be jetted at ejection frequencies in excess of 50 KHz. Further, upon jetting or curing, the unpleasant odor often associated with UV curable inks was reduced.

Example 12

Multi-Color Printing on Non-Porous and Porous Substrates

The cyan, black, and light cyan were jetted onto vinyl and polypropylene substrates using a micro machined HP-Scitex ink jet print head and E-1 print heads commercially available from Ricoh Co., Japan, Tokyo. The jetted inks were cured by continuous or flash UV radiation. The curing energy applied to the ink on the substrate was of about 50 millijoule/cm$^2$ to 150 millijoule/cm$^2$. Higher energy levels were required for Black ink curing. Once full ink curing was reached, it was observed that the gloss and density remained stable for a long period of time. Further, each of these inks remained stable for use after storage at various long storage conditions. All of the inks were jetted without ink degassing operations or devices. All prints passed industry standard tests of erasure, folding, cutting, and scratching. It was also observed that, in addition to good substrate adhesion, the inks adhered to one another when printed in layers.

In other tests, several of the ink-jet ink formulations set forth herein were jetted onto a vinyl substrate. Selected sections of jetted substrates were exposed to concentrated UV radiation such as those provided by UV lasers or UV LEDs. Curing occurred at 250 nm to 365 nm wavelengths. That being stated, the process described above illustrates localized curing by a concentrated spot of curing energy such as laser or LED does not change ink thickness or appearance, and once cured, the various inks could not be removed by solvents such as acetone, MEK, or alcohol, and were abrasion resistant.

Example 13

A black ink formulation having the composition detailed below was prepared.

| Ingredient (Trade Name and Chemical description) | Wt % |
|---|---|
| Genomer 3364 Modified Polyetherpolyol Acrylate | 11 |
| Craynor 435 Polyether Acrylate Oligomer | 13 |
| Sartomer 531 Cyclic Thimethylopropane Formal Acrylate (CTFA) | 17.3 |
| Crynor 386 Amine Acrylate | 2 |
| SR 256 97% 2-(2-ethoxyethoxy)ethyl acrylate 3% 2,2'-oxydiethyl diacrylate | 33.5 |
| SR 508 Dipropylene Glycol Diacrylate | 10 |
| IRG 379 | 2 |
| IRG 819 Phenyl Bis (2,4,6-trimethylbenzoyl)-phosphine oxide | 2 |
| Darocur ITX 2-isopropyl thioxanthone | 1 |
| Base 2621K | 7.5 |
| Hyper Blue #DW10629 (Symrise) Fragrance additive | 0.5 |
| TEGO Rad 2200 N (Degussa) Surfactant | 0.2 |

The black ink-jet ink prepared was jetted through a micromachined HP-Scitex ink-jet print head onto a polypropylene substrate and cured by continuous UV radiation at 20 mJ/cm$^2$ to 50 mJ/cm$^2$. The UV radiation caused the ink to cure on the polypropylene substrate. The cured ink was uniform and glossy and could withstand industry standard erasure scratch, folding and cutting tests. The ink-jet ink did not require subsequent air/gas extraction.

Example 14

A black ink formulation having the composition detailed below was prepared.

| Ingredient (Trade Name and Chemical description) | Wt % |
|---|---|
| Genomer 3364 Modified Polyetherpolyol Acrylate | 11 |
| Craynor 435 Polyether Acrylate Oligomer | 13 |
| Sartomer 531 Cyclic Thimethylopropane Foraml Acrylate (CTFA) | 11 |
| SR 256 97% 2-(2-ethoxyethoxy)ethyl acrylate 3% 2,2'-oxydiethyl diacrylate | 16.3 |
| SR 508 Dipropylene Glycol Diacrylate | 12.5 |
| V-caprolactam N-vinyl Caprolactam | 21 |
| IRG 379 | 2 |
| IRG 819 Phenyl Bis (2,4,6-trimethylbenzoyl)-phosphine oxide | 2 |
| Darocur ITX 2-isopropyl thioxanthone | 1 |
| Base 2621K | 7.5 |
| Hyper Blue #DW10629 (Symrise) Fragrance additive | 0.3 |
| TEGO Rad 2200 N (Degussa) Surfactant | 0.2 |

The black ink-jet ink prepared was jetted through a micromachined HP-Scitex ink-jet print head onto a polypropylene substrate and cured by continuous UV radiation at 20 mJ/cm$^2$ to 50 mJ/cm$^2$. The UV radiation caused the ink to cure on the polypropylene substrate. The cured ink was uniform and glossy and could withstand industry standard erasure scratch, folding and cutting tests. The ink-jet ink did not require subsequent air/gas extraction.

Example 15

A cyan ink formulation having the composition detailed below was prepared.

| Ingredient (Trade Name and Chemical description) | Wt % |
|---|---|
| Craynor 435 Polyether Acrylate Oligomer | 18 |
| SR 508 Dipropylene Glycol Diacrylate | 41.2 |
| SR285 Tetrahydrofurfuryl acrylate | 20 |
| V-caprolactam N-vinyl Caprolactam | 2.5 |
| Genomer 5275 Acrylated oligoamine resin | 2 |
| IRG 379 | 2 |
| IRG 819 Phenyl Bis (2,4,6-trimethylbenzoyl)-phosphine oxide | 2 |
| Darocur ITX 2-isopropyl thioxanthone | 2 |
| Base 2598 | 10 |
| Hyper Blue #DW10629 (Symrise) Fragrance additive | 0.1 |
| TEGO Rad 2200 N (Degussa) Surfactant | 0.2 |

The cyan ink-jet ink prepared was jetted through a micromachined HP-Scitex ink-jet print head onto a polypropylene substrate and cured by continuous UV radiation at 20 mJ/cm$^2$ to 50 mJ/cm$^2$. The UV radiation caused the ink to cure on the polypropylene substrate. The cured ink was uniform and glossy and could withstand industry standard erasure scratch, folding and cutting tests. The ink-jet ink did not require subsequent air/gas extraction.

The odour of the ink-jet ink was tested and was found to be particularly low and remained low for a significant period after curing.

Example 16

A black ink formulation having the composition detailed below was prepared.

| Ingredient (Trade Name and Chemical description) | Wt % |
| --- | --- |
| Craynor 435<br>Polyether Acrylate Oligomer | 13 |
| SR 508<br>Dipropylene Glycol Diacrylate | 60.7 |
| SR285<br>Tetrahydrofurfuryl acrylate | 10 |
| V-caprolactam<br>N-vinyl Caprolactam | 2.5 |
| Genomer 5275<br>Acrylated oligoamine resin | 2 |
| IRG 379 | 2 |
| IRG 819<br>Phenyl Bis (2,4,6-trimethylbenzoyl)-phosphine oxide | 2 |
| Darocur ITX<br>2-isopropyl thioxanthone | 2 |
| Base 2621K | 7.9 |
| Hyper Blue #DW10629 (Symrise)<br>Fragrance additive | 0.1 |
| TEGO Rad 2200 N (Degussa)<br>Surfactant | 0.2 |

The black ink-jet ink prepared was jetted through a micromachined HP-Scitex ink-jet print head onto a polypropylene substrate and cured by continuous UV radiation at 20 mJ/cm² to 50 mJ/cm². The UV radiation caused the ink to cure on the polypropylene substrate. The cured ink was uniform and glossy and could withstand industry standard erasure scratch, folding and cutting tests. The ink-jet ink did not require subsequent air/gas extraction.

The odour of the ink-jet ink was tested and was surprisingly found to be particularly low and remained low for a significant period after curing.

Example 17

A black ink formulation having the composition detailed below was prepared.

| Ingredient (Trade Name and Chemical description) | Wt % |
| --- | --- |
| Genomer 3364<br>Modified Polyetherpolyol Acrylate | 11 |
| SR 508<br>Dipropylene Glycol Diacrylate | 70.7 |
| V-caprolactam<br>N-vinyl Caprolactam | 2.5 |
| Genomer 5275<br>Acrylated oligoamine resin | 2 |
| IRG 379 | 2 |
| IRG 819<br>Phenyl Bis (2,4,6-trimethylbenzoyl)-phosphine oxide | 2 |
| Darocur ITX<br>2-isopropyl thioxanthone | 2 |

-continued

| Ingredient (Trade Name and Chemical description) | Wt % |
| --- | --- |
| Base 2621K | 7.5 |
| Hyper Blue #DW10629 (Symrise)<br>Fragrance additive | 0.1 |
| TEGO Rad 2200 N (Degussa)<br>Surfactant | 0.2 |

The cyan ink-jet ink prepared was jetted through a micromachined HP-Scitex ink-jet print head onto a polypropylene substrate and cured by continuous UV radiation at 20 mJ/cm² to 50 mJ/cm². The UV radiation caused the ink to cure on the polypropylene substrate. The cured ink was uniform and glossy and could withstand industry standard erasure scratch, folding and cutting tests. The ink-jet ink did not require subsequent air/gas extraction.

The odour of the ink-jet ink was tested and was surprisingly found to be particularly low and remained low for a significant period after curing.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A photo-curable ink composition for ink-jet printing, comprising
   a liquid vehicle,
   a milled pigment, the milled pigment being milled in a milling solvent having minimal to no gas solvency for the milled pigment,
   a photoinitiator, and
   a fragrance component which reduces the odor of the ink during printing or curing compared to the same ink prepared without the fragrance component;
   wherein the composition is ink-jettable at frequencies of at least 29 kHz without requiring degassing during printing and wherein the composition further comprises vinyl caprolactam.

2. The composition of claim 1, wherein the composition is ink-jettable at frequencies of at least 50 KHz without requiring degassing during printing.

3. The composition of claim 1, wherein the milling solvent comprises triethyleneglycol divinyl ether.

4. The composition of claim 1, wherein the composition includes a monoacrylate having a Glass Transition Temperature (Tg) which improves the flexibility of the ink layer compared to the same ink prepared without the mono acrylate.

5. The composition of claim 1, wherein the composition has a dissolved oxygen value of less than 5 ppm by weight.

6. The composition of claim 1, wherein the vinyl caprolactam is included in an amount of less than 5 wt %.

7. An ink-jet printing system, comprising:
   a) a media substrate;
   b) at least one photocurable ink-jet ink composition as defined in claim 1; and
   c) a photo energy source configured to apply photo energy to the ink-jet ink once printed on the non-porous substrate, said photo energy having a frequency and energy level suitable for curing the photo-curable ink-jet ink.

8. The system of claim 7, wherein the system includes two photo-curable ink-jet inks, each having a different hue or color density than the other.

9. The system of claim 8, wherein at least one of the photo-curable ink-jet inks includes an amine acrylate in an amount that improves cohesion between printed photo-curable ink-jet ink layers.

10. A method of printing an image, comprising:
   a) jetting a photo-curable ink-jet ink composition as defined in claim 1 onto a non-porous or low surface tension substrate at a firing frequency of greater than 29 KHz,
   b) applying photo energy to the photo-curable ink-jet ink once printed on a substrate, said photo energy having a frequency and energy level suitable for curing the photo-curable ink-jet ink.

11. The method of claim 10, further comprising jetting a second photo-curable ink-jet ink onto the substrate in layers with respect to the photo-curable ink-jet ink, wherein the photo-curable ink jet ink has a different hue or color density than the second photo-curable ink-jet ink.

* * * * *